Jan. 5, 1960

D. R. VON HOLLEN 2,919,643

MARKING APPARATUS

Filed March 25, 1958

INVENTOR.
DIETRICH R. VON HOLLEN
BY
ATTORNEY.

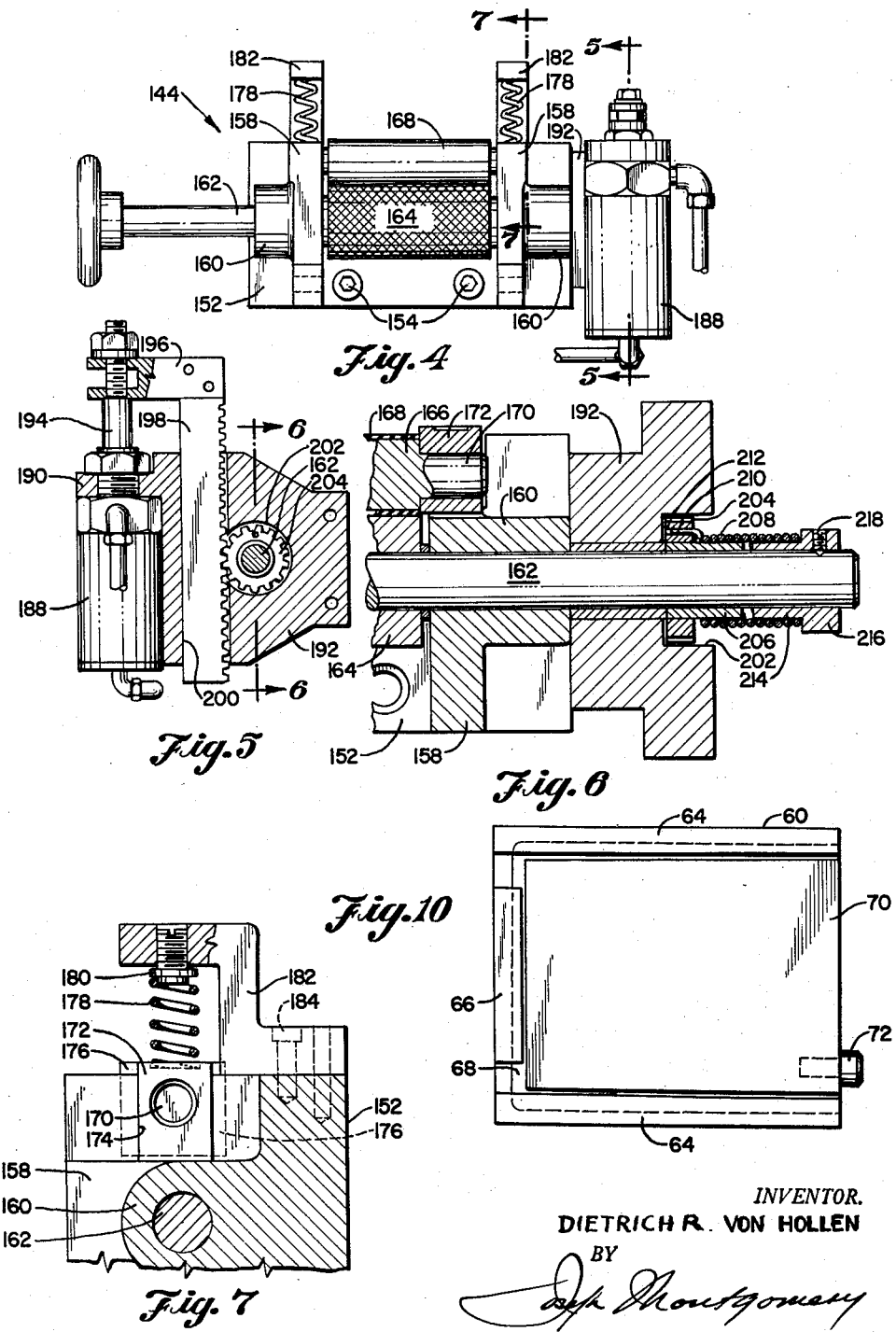

Jan. 5, 1960

D. R. VON HOLLEN 2,919,643

MARKING APPARATUS

Filed March 25, 1958

INVENTOR.
DIETRICH R. VON HOLLEN
BY
*Joseph Montgomery*
ATTORNEY.

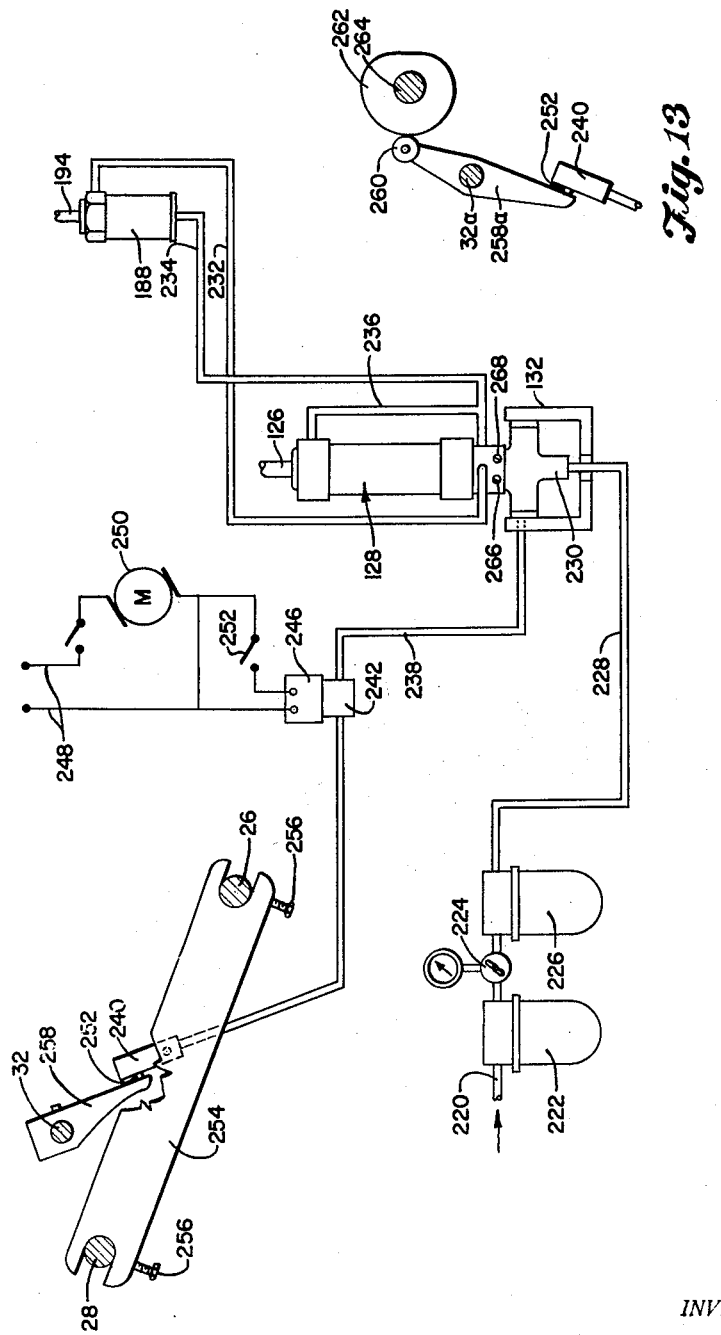

United States Patent Office 2,919,643
Patented Jan. 5, 1960

2,919,643
MARKING APPARATUS

Dietrich R. Von Hollen, Middle Village, N.Y., assignor to Adolph Gottscho, Inc., Hillside, N.J., a corporation of New York Application March 25, 1958, Serial No. 723,795

13 Claims. (Cl. 101—288)

This invention relates generally to marking apparatus, and more particularly is directed to apparatus for applying markings to an intermittently advanced continuous web or sheet as the latter is fed to a wrapping or other machine that utilizes the same.

Most of the bread presently sold is wrapped either in cellophane or waxed paper in order to preserve the freshness thereof. The wrapping of the bread is usually effected by automatic machines which cut suitable lengths from a continuous web or sheet of wrapping material printed with desired trademarks and decorative designs and which employ the cut lengths in individually wrapping the loaves of bread. Since it is necessary to control the stock or inventory of wrapped bread to ensure that the oldest stock is first placed on the shelves for sale, a demand has arisen for the application of date code markings to the lengths of wrapping material with which the loaves of bread are wrapped. Since a loaf of bread is relatively soft or yielding, it has been found that the usual hand stamping procedure employed for marking prices on articles offered for sale in supermarkets and other large self-service retail outlets cannot be effectively employed for marking prices on wrapped bread. Thus, it is necessary that the price be applied to the wrapping material at the bakery prior to the enclosure of the loaves of bread therein.

However, marking apparatus effective to apply price or date code markings to a cellophane or waxed paper must provide solutions to several unique problems. Any impression on cellophane has to be quick drying in order to adhere thereto, and, even then, if the impression is only quick drying, it will not necessarily be permanent. Further, an inked impression on waxed paper is not permanent at all, as the inked impression merely is applied to the top or outer surface of the wax coating and does not penetrate the latter so that, if the wax coating is rubbed with a finger, the body heat softens the wax and the impression may be removed. Inked impressions have several other disadvantages in that, if the ink does not dry fast enough, the impression may be smeared and, if a sufficiently fast drying ink is employed, such ink may dry in the reservoir or fountain and on the inking rolls, or on the face of the type.

Accordingly, it is an object of the present invention to provide apparatus capable of applying price or date code markings, or the like to cellophane, waxed paper or other wrapping material in a manner ensuring the permanency of the marking while permitting reliable and trouble free operation of the marking apparatus.

Most wrapping of bread is effected on intermittent, self-measuring wrapping machines, for example, the Type 3-22 bread wrapper produced by American Machine and Foundry Company, Brooklyn, New York. In such machines the continuous web or sheet of wrapping material is fed intermittently and, during the successive periods when the wrapping material is at rest, lengths thereof are cut from the continuous web, the dimension of each cut length being determined by the object to be wrapped therein. Since a nominal four inch loaf of bread may require a piece of wrapping material having a length between 17 to 21 inches to go completely therearound, it is not possible to use a predetermined single length of wrapping material for each loaf. Thus, in a bread wrapping machine of the kind identified above, the actual circumferential dimension of the loaf of bread to be wrapped determines the size of the length of wrapping material which is cut from a continuous web thereof. Since the lengths of the sections of wrapping material cut from the continuous web or sheet thereof may vary, it is not possible to accurately position or register markings applied to the web by a marking apparatus attached to the bread wrapping machine. However, it is desirable to apply the markings so that, when the cut lengths of wrapping material are used in wrapping individual loaves of bread, the applied markings will be as close as possible to a fixed location on the wrapped loaf. In order to achieve the above, it is necessary that the marking location be disposed a distance from the cut-off knife of the wrapping machine which is no greater than one cut-off length so that the differences in the locations of the markings on the wrapped loaves or other articles will not be multiplied beyond the variation in length of each cut-off section of wrapping material.

Thus, it is another object of the invention to provide a marking apparatus for use in connection with intermittent, self-measuring bread wrapping machines, and which is so constructed and arranged as to make possible the disposal of the marking location relatively close to the cut-off knife of the wrapping machine.

A further object is to provide marking apparatus of the described character that may be installed on existing wrapping machines and the like without requiring any major disassembling or reconstruction of the wrapping machine for that purpose.

In accordance with an aspect of this invention, price, date-code or other indicia are applied to a web of cellophane, waxed paper or other wrapping material from a hot roll leaf stamping tape by means of a heated die which has raised type and presses the tape against the wrapping material while the latter is supported on a suitably resilient platen. When cellophane is being marked, the heat and pressure applied to the roll leaf stamping tape causes the immediate deposit of a permanent impression upon the cellophane, which impression has the same size and shape as the raised type of the heated die. When applying markings to waxed paper, the heat from the die melts the wax coating and the pigment of the tape in the areas corresponding to the raised type so that the marking or impression penetrates to the surface of the paper and immediate permanent adhesion of the marking is obtained.

In accordance with another aspect of the invention, marking apparatus for use in connection with a bread wrapping machine or the like includes a reel carrying a supply of hot roll leaf stamping tape rotatably mounted at one side of the in-feed tunnel of the wrapping machine, a tape puller mounted at the opposite side of the wrapping machine to advance the tape laterally or at right angles with respect to the advancement of the wrapping material, guides suitably mounted within the in-feed tunnel for positioning the tape between a heated die assembly having a removable, raised-letter print block and a platen disposed under the web of wrapping material, and operating means controllable from the wrapping machine to cause the heated die to press downwardly upon the tape for applying markings through the latter to the web of wrapping material as the latter is supported on the platen during each period when the wrapping material is at rest, and for operating the tape puller during each subsequent movement of the wrapping material.

Further, in accordance with the invention, the marking apparatus of the described character includes a device for moving the heated die to its raised inoperative position when the associated wrapping machine or the like is stopped for any reason, thereby to avoid burning of the tape or wrapping material by reason of overlong contact of the heated die therewith.

The above, and other objects, features and advantages of the invention, will be apparent in the following detailed description of illustrative embodiments thereof which is to be read in connection with the accompanying drawings forming a part hereof, and wherein:

Fig. 4 is a detailed side elevational view, on an enlarged scale, of a tape puller included in the marking apparatus of Figs. 1 and 2;

Fig. 5 is a sectional view taken along the line 5—5 of Fig. 4;

Fig. 6 is an enlarged sectional view taken along the line 6—6 of Fig. 5;

Fig. 7 is an enlarged fragmentary sectional view taken along the line 7—7 of Fig. 4;

Fig. 10 is a top plan view of a platen shown in Fig. 3;

Fig. 12 is a schematic view illustrating the pneumatic and electrical control systems employed in connection with the marking apparatus embodying this invention; and Fig. 13 is a fragmentary schematic view illustrating a modification of a part of the system illustrated in Fig. 12.

Figure 1:
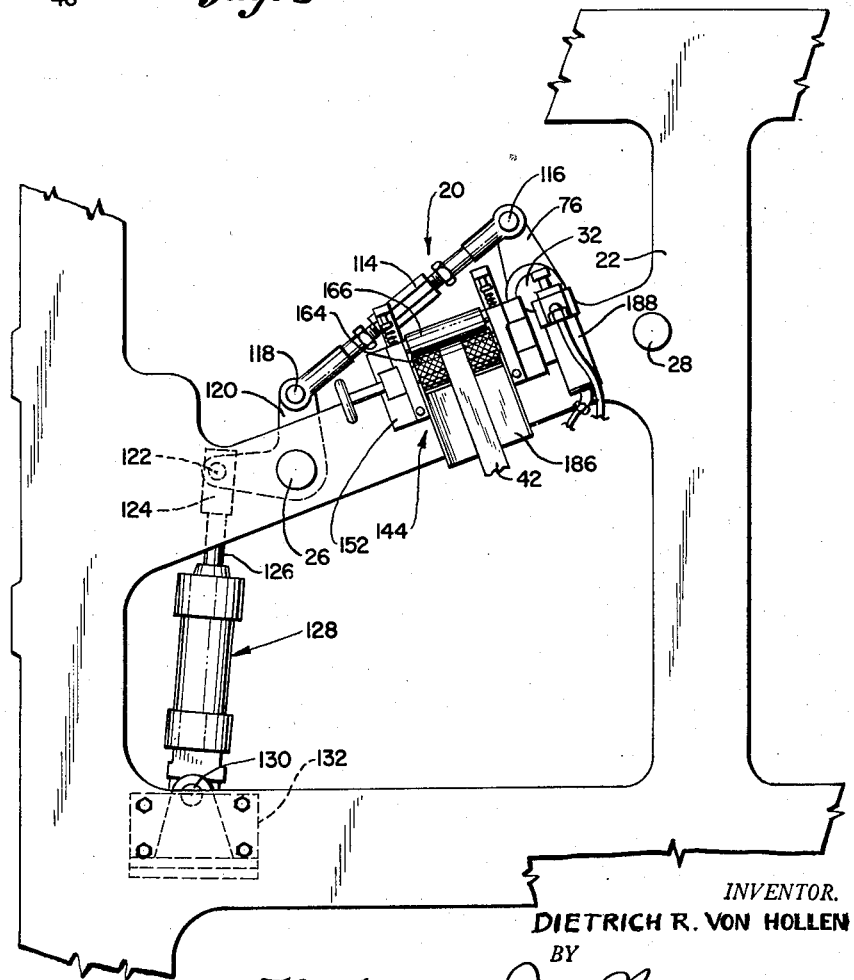
Fig. 1 is a side elevational view of a marking apparatus embodying this invention and shown applied to the frame of a conventional bread wrapping machine.
Figure 2:
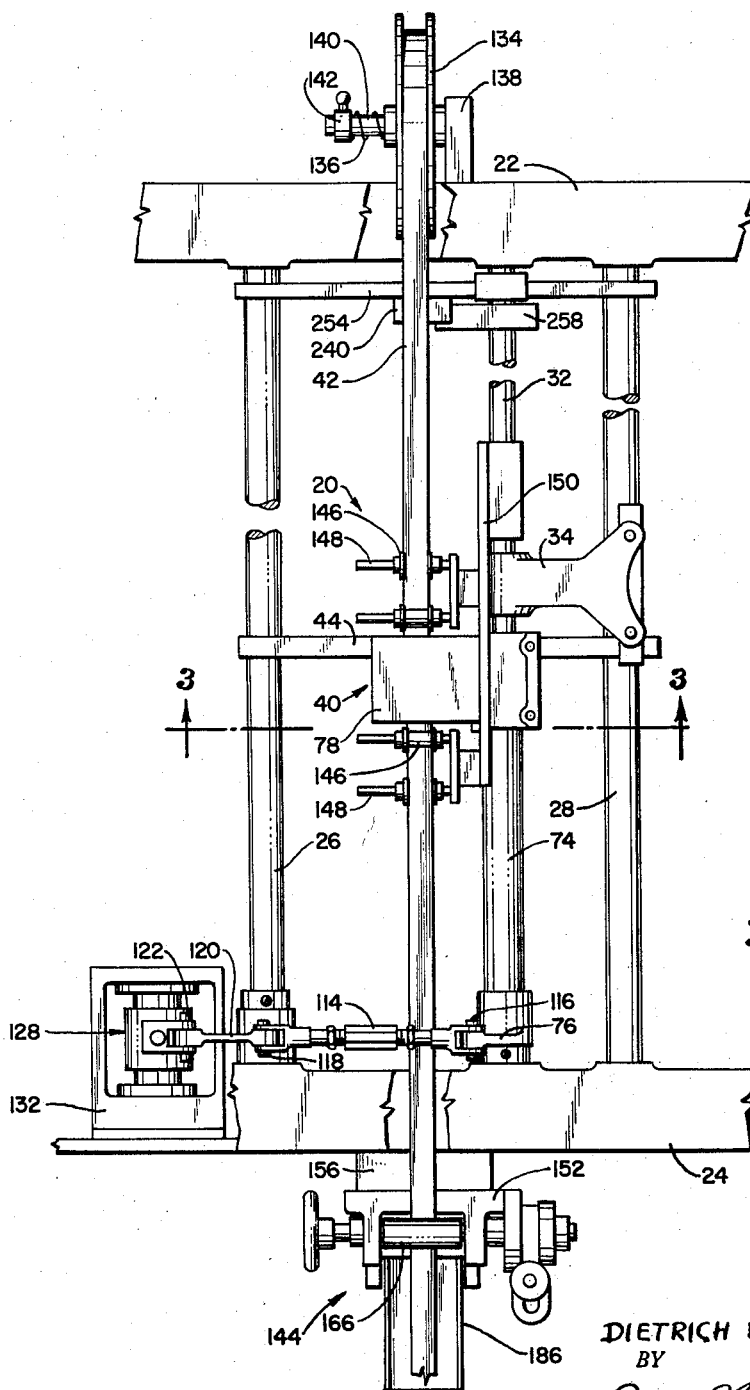
Fig. 2 is a top plan view of the marking apparatus of Fig. 1.

Referring to the drawings in detail and initially to Figs. 1 and 2 thereof, it will be seen that a marking apparatus embodying this invention, and there generally identified by the reference numeral 20, is made up of a number of sub-assemblies which are mounted at the in-feed tunnel of a bread wrapping machine, for example, the Type 3-22 bread wrapper produced by American Machine and Foundry Company, Brooklyn, New York. Figs. 1 and 2 only illustrate those portions of the in-feed tunnel of the bread wrapping machine employed for either the mounting or operation of the marking apparatus 20, and including side frame members 22 and 24 having lateral rods 26 and 28 extending therebetween to carry a plate 30 which appears only in Fig. 3 and has been omitted from Fig. 2 for the sake of clarity. The plate 30 supports the web of cellophane, waxed paper or other wrapping material as the later is fed through the in-feed tunnel of the wrapping machine toward the cut-off knife (not shown) of the latter. Further, the illustrated portion of the existing bread wrapping machine includes an intermittently oscillated shaft 32 which extends parallel to the rods 26 and 28 and is journalled, at its opposite ends, in suitable bearings carried by side frame members 22 and 24.

The shaft 32 is disposed above the plate 30 (Fig. 3) and carries a clamping member 34 (Fig. 2) which extends radially therefrom in the general direction of the intermittent movement of the wrapping material through the in-feed tunnel. During each period of intermittent movement of the wrapping material, shaft 32 is rocked in the counterclockwise direction, as viewed in Figs. 1 and 3, to raise the clamping member 34, and the shaft 32 is rocked in the clockwise direction, during the intervals between the periods of movement, so that the clamp 34 moves downwardly upon the wrapping material on the plate 30 to hold the wrapping material against any movement while the wrapping material is being cut.

In order to apply the marking apparatus 20 embodying this invention to the illustrated bread wrapping machine, the only alteration or modification of the latter that is required consists in the cutting of an opening 36 (Fig. 3) in the plate 30 in the region of the shaft 32 so that a platen assembly, which is generally identified by the reference numeral 38 and positioned below the plate 30, can project through the opening 36 to cooperate with a die or print block assembly, which is generally identified by the numeral 40 and supported from the shaft 32, for effecting the transfer of an impression from hot roll leaf stamping tape 42 (Fig. 2) to the wrapping material as the latter is at rest and supported, in the marking area, by the platen assembly 38.

Figure 3:
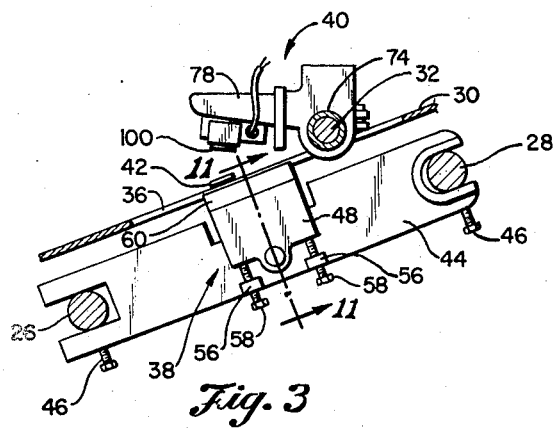
Fig. 3 is a sectional view taken along the line 3—3 of Fig. 2.
Figure 11:
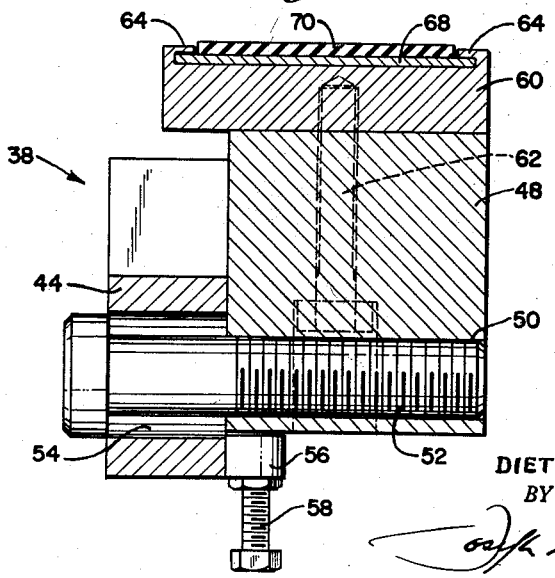
Fig. 11 is an enlarged sectional view taken along the line 11—11 of Fig. 3.

Referring in detail to Figs. 3, 10 and 11, it will be seen that the platen assembly 38 includes a support member 44 generally in the form of an elongated plate having bifurcated opposite ends to receive the rods 26 and 28 when the support member 44 is disposed parallel to side frame members 22 and 24. The bifurcated ends of member 44 are provided with set screws 46 which secure the support member with respect to rods 26 and 28. The platen assembly 38 further includes a body 48 adapted to be positioned at one side of support member 44 and having a tapped bore 50 extending laterally therethrough so that a bolt 52 which passes through an opening 54 in support member 44 can be threaded into tapped bore 50 to secure body 48 to the support member. As shown in Fig. 11, the opening 54 is elongated in the direction perpendicular to the longitudinal axis of support member 44 so that the body 48 can rock about the axis of bolt 52 and also move bodily relative to support member 44 in the direction of elongation of opening 54.

In order to establish the position of body 48 relative to support member 44, the latter is provided with lugs 56 extending laterally from the bottom edge at opposite sides of the opening 54 and provided with threaded apertures receiving screws 58 which abut against the bottom surface of body 48, as shown in Fig. 3, so that, by adjusting the set screws 58, the body 48 can be positionally adjusted relative to support member 44 to insure that the effective surface of the platen assembly will lie in the same plane as the raised surfaces of type carried by the die or print block assembly 40 when the latter is in its operative position, as hereinafter described.

A platen block 60 is removably secured on the top surface of body 48, as by machine screws 62 (Fig. 11), and is provided with inwardly directed rims or flanges 64 and 66 at two sides and at one end, respectively, of its upper surface. A platen cushion is adapted to be removably held on the top surface of platen block 60 by the flanges 64 and 66 and includes a metal plate 68 (Figs. 10 and 11) dimensioned so that its periphery will be received under the flanges 64 and 66 when the plate is slidably introduced at the end of the platen block remote from the flange 66, and a layer 70 of platen material, for example, rubber or the like, bonded to the surface of plate 68. A machine screw 72 (Fig. 10) is received in a tapped opening in the end of block 60 remote from flange 66 so that the head of screw 72 will be engageable with the adjacent end of plate 68 to removably secure the platen cushion against withdrawal from the platen block.

Figure 8:
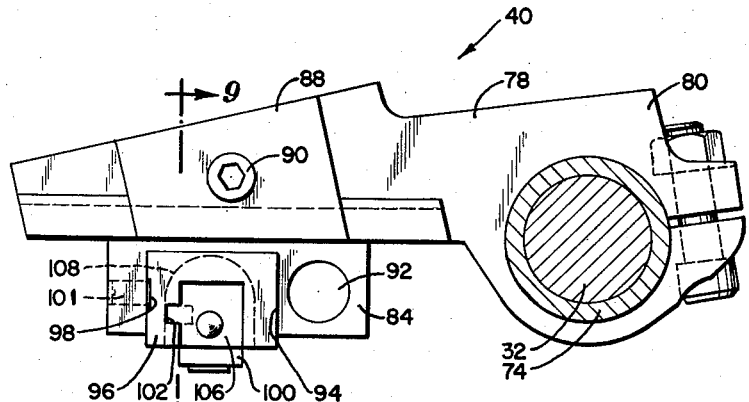
Fig. 8 is an enlarged side elevational view of a die or print block assembly shown in Fig. 3.
Figure 9:
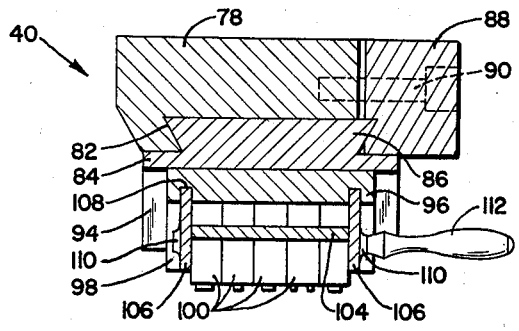
Fig. 9 is a sectional view taken along the line 9—9 of Fig. 8.

As shown in Figs. 2, 3 and 8, the die or print block assembly 40 includes a main support in the form of a tube 74 which telescopes over a portion of the shaft 32 and which is free to rotate relative to the latter. A radial arm 76 is secured on the tube 74 at the end of the latter adjacent side frame member 24 (Figs. 1 and 2), and a print block 78 is formed with a split clamp 80 (Fig. 8) at one end so that the print block 78 can be adjustably secured on the tube 74 at a location where the print block laterally registers with the platen assembly 38. Print block 78 extends radially from tube 74 and, in its lower surface, is formed with a dovetail guideway 82 (Fig. 9). A housing 84 is formed with a dovetail projection 86 on its upper surface which is slidably received in guideway 82 through the open end of the latter at the free end of print block 78 and is adjustable along the latter in order to vary the radial distance of housing 84 from the axis of shaft 32. Block 78 is also formed with a cutout at one side to accommodate a clamping element 88 which is secured to print block 78, for example, by a machine screw 90, and which engages one side of the dovetail projection 86 to secure housing 84 in its adjusted position relative to print block 78.

Housing 84 is formed with a lateral bore receiving a conventional electric heating element 92 (Fig. 8) and also with a rectangular, laterally extending cutout 94 opening downwardly and at its opposite ends for receiving a removable case 96 of rectangular configuration. Case 96 has a shallow groove 98 extending along one side surface thereof, and housing 84 has a set screw 101 (shown in broken lines on Fig. 8) which extends into cutout 94 to engage in groove 98 of case 96 for releasably securing the latter within housing 84.

Referring to Figs. 8 and 9, it will be seen that the case 96 has a generally rectangular cutout 98 opening downwardly and laterally at the opposite ends of the case to receive a series of type pieces 100 having raised letters or numerals on their lower surfaces. Each piece of type 100 has a groove in one side edge thereof, and the case 96 is formed with a laterally extending groove 102 in the corresponding surface of cutout 98 so that a key 104 received in the groove 102 and in the grooves of the pieces of type 100 holds the latter within the case. Movement of the pieces of type along the key 104 is prevented by end plates 106 which are received in grooves 108 formed in the top and side surfaces of the cutout 98, and the end plates 106 are formed with threaded sockets 110 so that a threaded extension on a handle 112 may be screwed into one of the sockets 110 to provide means by which the case 96 with the type pieces therein may be transported and inserted in, or removed from, the housing 84.

It will be apparent that, with the construction of the die or print block assembly 40 described above, the location of the impression applied to the wrapping material may be adjusted in the direction of movement of the latter by displacing the housing 84 along the dovetail guide 82 of print block 78, and that the impression to be applied to the wrapping material may be easily changed by loosening set screw 100 so that case 96 can be slidably withdrawn from housing 84 for replacement of the pieces of type 100 held in the case.

In order to effect angular movement of tube 74 for moving the type pieces 100 toward and away from wrapping material disposed on top of platen block 60, the marking apparatus 20 further includes a link 114 (Figs. 1 and 2) of adjustable length pivotally connected at one end, as at 116, to the free end of arm 76 and pivotally connected at its other end, as at 118, to one arm of a bell crank 120 which is rockably mounted on the rod 126. The other arm of bell crank 120 is pivotally connected, as by a pin 122, to a clevis 124 secured to the end of a piston rod or ram 126 of an air motor and valve assembly which is generally identified by the reference numeral 128, and which is pivotally mounted at its lower end, as at 130, on a bracket 132 secured to the adjacent side frame member 24. The air motor and valve assembly 128 is of the kind available from Lehigh, Inc., of Easton, Pennsylvania, under the designation 2LA573 and is capable of operation in the manner hereinafter described in detail.

A supply of the hot roll leaf stamping tape 42 is provided in the form of a roll on a reel 134 (Fig. 2) which is rotatably mounted on a shaft 136 carried by a bracket 138 secured to the side frame member 22. A helical spring 140 is provided on the shaft 136 between the hub of reel 134 and an adjustable collar 142 to act as a friction brake so that rotation of reel 134 occurs only in response to a pull exerted on the tape, and the frictional resistance to rotation of the reel may be varied by adjusting the collar 142 along shaft 136. The tape 42 drawn from reel 134 passes laterally across the in-feed tunnel of the wrapping machine to a tape puller assembly which is generally identified by the reference numeral 144 and which is mounted upon side frame member 24 of the wrapping machine. In passing from reel 134 to tape puller assembly 144, the tape 42 is guided above the wrapping material on plate 30 between print block 78 and platen block 60 by means of nylon rollers 146 which are rotatably carried by spindles 148 mounted on a bracket 150 secured to the shaft 32 of the wrapping machine.

Referring now to Figs. 4 to 7, inclusive, it will be seen that the tape puller assembly 144 includes a supporting bracket 152 which is secured by bolts 154 (Fig. 4) to a mounting block 156 (Fig. 2) on side frame member 24. The bracket 152 has spaced apart, parallel ears 158 projecting outwardly therefrom and formed with hollow bosses 160 which rotatably support a shaft 162, and a knurled tape puller roll 164 is secured on the shaft 162 in the space between the ears 158. A pressure roller 166 having a resilient covering 168 of natural or synthetic rubber, such as, neoprene, is provided with trunnions 70 at its opposite ends which are journalled in bearing blocks 172. Each bearing block 172 is slidable in an upwardly opening guideway 174 formed in the related ear 158 of bracket 152, and flanges 176 (Fig. 7) are formed along the opposite edges of each bearing block 172 to slidably engage against the inner surface of the related ear 158, thereby to prevent axial movement of the bearing block out of the guide way 174 in the direction away from pressure roll 166. Each bearing block 172 is urged downwardly by a helical compression spring 178 which, at its lower end, is received in a suitable recess formed in the top surface of the bearing block 172 and, at its upper end, abuts against a spring holder 180 (Fig. 7) adjustably screwed into a Z-shaped bracket 182 secured, as by a bolt 184, to the upper surface of the adjacent ear 158 of bracket 152. Thus, the bearing blocks 172 are urged downwardly in guideways 174 toward the axis of rotation of knurled tape puller roll 164 so that the resilient surface of pressure roll 166 is pressed against the knurled surface of roll 164 to grip the tape 42 passing therebetween, as in Fig. 1, and thereby to ensure feeding movement of the tape in response to rotation of roll 164. A chute 186 (Figs. 1 and 2) is suitably mounted on bracket 152 and extends downwardly and outwardly away from the tape puller roll 164 to guide the used tape 42 away from the tape puller assembly.

In order to effect intermittent rotation of tape puller roll 164 in the direction for pulling the tape 42 from reel 134 across the in-feed tunnel of the wrapping machine, the tape puller assembly 144 further includes an air motor 188 which is suspended, at its upper end, from a lug 190 projecting from a housing 192 that is secured to one end of bracket 152. The air motor 188 has the usual piston rod or ram 194 which, at its upper end, is adjustably secured to a head 196 (Fig. 5). The head 196 is connected to the upper end of a gear rack 198 which extends parallel to piston rod 194 and is slidably received in a channel 200 formed in housing 192. Housing 192 further has a bore receiving shaft 162 and a concentric circular recess or counter bore 202 which opens, at its periphery into channel 200. A spur gear 204 disposed in recess 202 meshes with gear rack 198 and is rotatably mounted on a bushing 206 on shaft 162 (Fig. 6) so that gear 204 is free to turn relative to shaft 162.

It is apparent that, as the piston rod 194 of air motor 188 moves upwardly and downwardly, the corresponding reciprocation of gear rack 198 will effect rotation of spur gear 204 in the clockwise and counter-clockwise directions, respectively, as viewed in Fig. 5. However, since the tape 42 is to be fed only in the direction from reel 134 toward tape puller assembly 144, it is necessary that the shaft 162 carrying tape puller roll 164 should be rotated only in the counter-clockwise direction, as viewed in Fig. 5, during the downward stroke of piston rod 194. Such intermittent rotation of shaft 162 is provided by a one-way releasable coupling which operatively connects gear 204 to shaft 162 only during turning of gear 204 in the desired direction. As shown in Fig. 6, the one-way releasable coupling between gear 204 and shaft 162 preferably includes a helical torsion spring 208 having one end 210 received in an opening 212 provided in gear 204 to rotate with the latter. The helical torsion spring 208 extends over bushing 206 and over the hub 214 of a collar 216 which is secured to shaft 162, as by a set screw 218, and the end of spring 208 remote from gear 204 merely abuts axially against collar 216 thereby to limit the axial extent of helical spring 208 to the distance between gear 204 and collar 216. The external diameter of hub 214 is only slightly less than the internal diameter of helical spring 208 in the unstressed condition of the latter, and the turns of the spring are arranged so that, when the gear 204 is turned in the counter-clockwise direction, as viewed in Fig. 5, such turning of the end 210 of the spring with the gear 204 while the other end frictionally engages collar 216 tends to tighten the spring 208 upon the hub 214 of collar 216 so that the hub is gripped within the helical spring to cause rotation of collar 216 and shaft 162 with gear 204.

On the other hand, when gear 204 is turned in the opposite direction, clockwise as viewed in Fig. 5, the spring 208 tends to loosen or expand diametrically and slips relative to the hub 214 of collar 216 so that the shaft 162 remains immobile. Thus, shaft 162, and the tape puller roll 164 secured thereon are rotated intermittently in only one direction in response to reciprocation of gear rack 198 by the piston or ram 194 of air motor 188.

Referring to Fig. 12 of the drawings, it will be seen that compressed air for operating the air motor and valve assembly 128 and the air motor 188 is received through a supply pipe 220 and passes successively through a filter 222, a pressure regulator 224 and an oiler 226 which are available as a unit from Air Mite, Inc., under the designation Air Mite Control Unit No. FRO–250. After passing through the filter, pressure regulator and oiler unit, the compressed air supply passes through a pipe 228 to an inlet 230 of the valve housing of air motor and valve assembly 128. The upper and lower ends of the cylinder of air motor 188 are connected to the valve housing of assembly 128 by way of pipes 232 and 234, respectively, while a branch pipe 236 extends from the pipe 234 to the upper end of the cylinder of air motor and valve assembly 128. Further, the valve housing of assembly 128 is connected, by way of a pipe 238 to a conventional pilot valve 240 which may be of the kind available from Lehigh, Inc., under the designation MA–446, and a shut-off valve 242 is interposed in the pipe 238 and is actuated by a solenoid 246. The solenoid 246 opens the associated valve 242 only when the solenoid is energized, and the solenoid 246 is electrically connected to the load side of the electric supply lines 248 feeding the motor 250 of the wrapping machine so that the solenoid 246 can be energized only when the motor 250 is operating. Further, a switch 252 is provided in the connection to solenoid 246 so that, when switch 252 is open, the motor 250 can operate the bread wrapping machine without energizing solenoid 246, and thus, without opening valve 242.

The pilot valve 240 is of the kind having a plunger 252 projecting from the housing and effective to open the pilot valve only when the plunger 252 is depressed.

In accordance with the invention, the pilot valve 240 which initiates each operating cycle of the marking apparatus 20 is actuated in synchronism with the operation of the associated wrapping machine. Thus, as shown in Figs. 2 and 12, the pilot valve 240 may be carried by a support member 254 which extends between the rods 26 and 28 adjacent side frame member 22 and which is secured to the supporting rods by set screws 256. A tripper arm 258 is secured on shaft 32 adjacent side frame member 22 and is angularly positioned with respect to shaft 32 so that, when the latter is rocked or turned in the direction for moving the clamp 34 downwardly upon the wrapping material lying on plate 30, tripper arm 258 moves against and depresses plunger 252 of pilot valve 240 and thereby opens the pilot valve. On the other hand, when shaft 32 is rocked in the direction for releasing clamp 34 from the wrapping material, tripper arm 258 is moved away from plunger 252 to release the latter and thereby cause closing of pilot valve 240.

If desired, as shown in Fig. 13, the plunger 252 of pilot valve 240 may be actuated by a tripper arm 258a which is rockable on a pivot shaft 32a and carries a roller 260 engaging a cam 262 on the main shaft 264 of the bread wrapping machine so that the period during which the actuating plunger 252 of the pilot valve is depressed during each operating cycle of the wrapping machine will depend upon the contour of the cam 262 and will be independent of the period during which the clamp 34 is in its operative position pressed downwardly against the wrapping material.

The previously described marking apparatus 20 embodying the invention operates as follows:

As already mentioned, the associated wrapping machine effects the intermittent advance of the wrapping material over the plate 30 in the in-feed tunnel of the wrapping machine. While the wrapping material is stationary, that is, during each period between successive advancements thereof, pilot valve 240 is actuated by depression of its plunger 252, either by reason of turning of shaft 32 of the wrapping machine to move clamp 34 to its operative position, as in the embodiment of Figs. 2 and 12, or by the action of the cam 262 of the embodiment illustrated in Fig. 13. When the plunger 252 of pilot valve 240 is depressed, the valve arrangement of air motor and valve assembly 128 causes air to be supplied through the pipes 234 and 236 to the lower end of the cylinder of air motor 188 and to the upper end of the cylinder of air motor and valve assembly 128 so that the piston rod or ram 126 of the latter is moved downwardly, while the ram 194 of air motor 188 is moved upwardly. By reason of the one-way coupling formed by spring 208 between the gear 204 and the collar 216 on shaft 162, the rotation of gear 204 resulting from upward movement of ram 194 is not transmitted to shaft 162 carrying roller 164 of the tape puller assembly. However, the downward movement of ram 126 of air motor and valve assembly 128 effects turning of tube 74, by way of bell crank 120, link 114 and arm 76, so that print block 78 is angularly displaced downwardly toward the platen assembly 38. The set screws 58 (Fig. 3) make it possible to adjust the position of platen block 60 so that, when print block 78 is moved downwardly against the tape 42 on the wrapping material supported by the platen, as described above, the plane of the raised faces of type pieces 100 will be parallel to the plane of the cushion or resilient layer 70 on the platen block. Thus, the raised faces of the type pieces 100 which are heated by the heating element 92 will apply heat and pressure to the hot roll leaf stamping tape 42 against the surface of the wrapping material supported on the cushion 70 of platen block 60 and, by reason of the heat and pressure applied to the tape, the pigment in those parts of the tape corresponding to the raised surfaces of the type pieces is melted and an impression is deposited on the wrapping material having the exact size and shape of the heated type. When the wrapping material is waxed paper, the wax coating is melted along with the pigment of the stamping tape so that the impression reaches through the wax coating down to the paper base. Thus, whether the wrapping material is waxed paper or cellophane, an immediate impression having permanent adhesion to the wrapping material is obtained.

It is obvious that the heat applied by the print block assembly 40 may be controlled by conventional adjustable thermostat means interposed in the electric circuit (not shown) feeding the heating element 92, and that the pressure applied by the type pieces against the marking tape 42 can be adjusted by the air pressure regulator 224 connected in the compressed air supply line.

When the plunger 252 of pilot valve 240 is no longer depressed, air is supplied to the lower end of the cylinder of air motor and valve assembly 128 to move the ram 126 upwardly, and thereby to turn tube 74 in the direction raising the type pieces 100 away from platen block 60. During such upward movement of ram 126, the valves of air motor and valve assembly 128 bleed air through the pipe 232 to the upper end of the cylinder of air motor 188 so that ram 194 of the latter is moved downwardly. During such downward movement of ram 194, gear rack 198 turns gear 204, and this rotational movement of the gear is transmitted to shaft 162, by the previously described one-way coupling, in order to rotate knurled tape puller roll 164 in the direction for feeding tape from reel 134 laterally across the in-feed tunnel of the wrapping machine. Thus, the described marking apparatus causes an impression to be applied from the tape 42 to the wrapping material during the periods when the latter is at rest, and advances the tape 42 across the path of movement of the wrapping material when the type pieecs 100 of the print block or die assembly 40 are raised out of contact with the tape.

It should be noted that the air motor and valve assembly 128 is provided with adjustable metering valves 266 and 268 (Fig. 12) capable of controlling the reciprocating strokes of the rams 126 and 194 so that, an the case of the ram 194, adjustment of the length of the stroke thereof is effective to regulate the length of the tape 42 fed during each operating cycle of the marking apparatus.

Further, it will be apparent that, when the valve 242 is closed by reason of deenergization of its solenoid 246, either as a result of the inoperativeness of the wrapping machine motor 250 or as a result of opening of the switch 252, closing of the valve 242 creates a condition similar to that obtained when the actuating plunger 252 of pilot valve 240 is released so that ram 126 is moved upwardly to raise the type pieces out of contact with the tape 42. Accordingly, if the wrapping machine is stopped at a time when the type piece 100 press tape 42 against the wrapping material to apply an impression to the latter, the heated die assembly 40 is automatically raised in order to prevent burning or damage to the tape and wrapping material by reason of overlong contact of the heated type pieces with the tape.

From the above description of the illustrated embodiments of the invention, it will be seen that the marking apparatus 20 is formed of a series of sub-assemblies, for example, the platen assembly 38, the die or print block assembly 40, the tape puller assembly 144, and the air motor and valve assembly 128, which can be mounted on an existing bread or other wrapping machine with a minimum of modification or alteration of the latter. Further, since the sub-assemblies which make up the marking apparatus and are connected by the various described pipes for transmitting fluid under pressure therebetween are individually of relatively small size, the die or print block assembly 40 and the platen assembly 38 may be mounted within the restricted space in the in-feed tunnel at a location close to the cut-off knife of the wrapping machine. Thus, the marking location is no more than one cut-off length away from the cut-off knife, so that, in the case of a self-measuring wrapping machine, the variation in the position of the marking on the wrapped article resulting from variations in the cut-off length of the wrapping material will be minimized.

Although illustrative embodiments of the invention have been described in detail herein with reference to the accompanying drawings, it is to be understood that the invention is not limited to those precise embodiments, and that various changes and modifications may be effected therein without departing from the scope or spirit of the invention, except as defined in the appended claims.

What is claimed is:

1. Apparatus for applying markings to a continuous, intermittently advanced web from a hot roll leaf stamping tape, comprising means holding a supply of the tape at one side of the path of advancement of the web, tape puller means at the opposite side of the path of the web and operative to feed the tape laterally across the web from said holding means, a platen disposed below the web at the location where the latter is traversed by the tape, means supporting said platen for rocking about an axis which extends laterally with respect to said path of the web and is movable toward and away from the plane of the web, heated die means, means supporting said die means for rocking about an axis disposed above the web and extending laterally with respect to the latter so that said die means is movable about its rocking axis between a raised inoperative position and a lowered operative position where the die means bears upon the tape and presses the latter against the web resting on said platen, adjustable means positioning said platen with respect to said supporting means for the platen so that the upper surface of the platen and the lower surface of said die means are in parallel relationship when said die means is in said operative position, and actuating means controlled in synchronism with the intermittent advancement of the web to move said die means to said operative position when the web is at rest for then effecting the transfer of an impression from the tape to the web and to return said die means to said inoperative position and operate said tape puller means during each advancement of the web.

2. Apparatus for applying markings to a continuous, intermittently advanced web from a pigmented tape, comprising means holding a supply of the pigmented tape at one side of the path of intermittent advancement of the web, tape puller means at the opposite side of the path of the web and operative to pull the tape across the web from said holding means through a predetermined distance, a platen disposed below the web at a location where the latter is traversed by the pigmented tape, a die assembly including a support block mounted for swinging about an axis extending laterally with respect to the path of the web above the latter, said support block registering laterally with said platen, a housing carried by said support block and adjustable with respect to the latter in the radial direction from the swinging axis of the support block, a heating element in said housing, said housing having a recess opening downwardly and laterally at its opposite ends and type pieces held in said recess of the housing, actuating means for moving said die assembly between an inoperative position where type pieces in said housing are raised from the tape and an operative position where the type pieces bear against the tape on the web supported by said platen to apply heat and pressure for marking the web with an impression from the pigmented tape, and control means for said actuating means and said tape puller means synchronized with the intermittent advancement of the web to move said die assembly to said operative position when the web is at rest and to return said die assembly to said inoperative position and operate said tape puller means during each advancement of the web.

3. Apparatus as in claim 2; wherein said support block has a dove-tail groove in its lower surface opening at the end of said support block remote from the swinging axis thereof and a laterally opening recess at one side of said groove, and said housing has a dove-tail shaped projection at the top which is slidable in said groove; and further comprising a clamping member received in said laterally opening recess to engage said projection of the housing in said groove, and means securing said clamping member laterally to said support block for seizing said projection of the housing.

4. Apparatus as in claim 2; wherein said recess of the housing has a laterally extending groove in one side thereof and said type pieces have aligned grooves in the side edges thereof facing said one side of the recess, a key received in said groove of the recess and said grooves of the type pieces to hold the latter against falling from said recess, and removable end plates fitting in the opposite end portions of said recess to retain the type pieces therebetween.

5. In a wrapping machine having an in-feed tunnel with a support plate therein over which a continuous web of wrapping material is intermittently advanced and a laterally extending turnable shaft carrying a clamping member which is moved against the plate to grip the wrapping material when the latter is at rest and displaced away from the plate during each advancement of the web; the combination of means holding a supply of the pigmented tape at one side of said in-feed tunnel, tape puller means at the opposite side of said in-feed tunnel and operative to feed the pigmented tape across the in-feed tunnel above the web on said plate, said support plate having an opening therein traversed by said tape, a platen projecting upwardly into said opening of the support plate, die means, means mounting said die means on said turnable shaft for movement relative to the latter between an inoperative raised position and an operative position where said die means presses the tape against the web supported on said platen to apply an impression from said tape to the web, and actuating means controlled in synchronism with the intermittent advancement of the web to move said die means to said operative position when the web is at rest and to return said die means to said inoperative position and operate said tape puller means during each advancement of the web.

6. In a wrapping machine having an in-feed tunnel with a support plate therein over which a continuous web of wrapping material is intermittently advanced and a laterally extending turnable shaft carrying a clamping member which is moved against the plate to grip the wrapping material when the later is at rest and displaced away from the plate during each advancement of the web; the combination of means holding a supply of the pigmented tape at one side of said in-feed tunnel, tape puller means at the opposite side of said in-feed tunnel and operative to feed the pigmented tape across the in-feed tunnel above the web on said plate, said support plate having an opening therein traversed by said tape, a platen projecting upwardly into said opening of the support plate, die means, means mounting said die means on said turnable shaft for movement relative to the latter between an inoperative raised position and an operative position where said die means presses the tape against the web supported on said platen to apply an impression from said tape to the web, and actuating means controlled from said turnable shaft to move said die means to said operative position when said clamping member grips the wrapping material while the latter is at rest and to return said die means to said inoperative position and operate said tape puller means when said clamping member is displaced away from the support plate during each advancement of the web of wrapping material.

7. In a wrapping machine having an in-feed tunnel with a support plate therein over which a continuous web of wrapping material is intermittently advanced and a laterally extending turnable shaft carrying a clamping member which is moved against the plate to grip the wrapping material when the latter is at rest and displaced away from the plate during each advancement of the web; the combination of means holding a supply of the pigmented tape at one side of said in-feed tunnel, tape puller means at the opposite side of said in-feed tunnel and operative to feed the pigmented tape across the in-feed tunnel above the web on said plate, said support plate having an opening therein traversed by said tape, a platen projecting upwardly into said opening of the support plate, die means, a tube rotatable on said shaft for turning relative to the latter and having said die means extending generally radially therefrom for movement with said tube between an inoperative raised position and an operative position where said die means presses the tape against the web of wrapping material supported on said platen to apply an impression from said tape to the web, and actuating means controlled in synchronism with the intermittent advancement of the web to turn said tube for disposal of said die means in said operative position when the web is at rest, and to turn the tube for disposal of said die means in said inoperative position and to operate said tape puller means during each advancement of the web.

8. The combination as in claim 7; wherein said actuating means includes a first reciprocating pressure fluid operated motor, transmission means between said first motor and said tube to turn the latter in opposite directions in response to reciprocation of said first motor, a second reciprocating pressure fluid operated motor and transmission means between the latter and said tape puller means to operate the latter only in response to the stroke of said second motor in one direction, and means for cyclically regulating the supplying of fluid under pressure to said first and second motors.

9. The combination of a wrapping machine including an in-feed tunnel with a plate therein supporting a continuous web of wrapping material and a drive motor, which during operation thereof, causes intermittent advancement of the web over said plate, said plate having an opening therein, means holding a supply of pigmented tape at one side of the in-feed tunnel, tape puller means at the other side of the in-feed tunnel operative to pull the tape from said holding means for movement across the tunnel above the web supported on said plate, a platen extending upwardly through said opening of the plate to support the web at said opening, heated die means disposed above said plate and movable between an inoperative raised position and an operative position where said die means applies heat and pressure to said tape against the web on said plate, thereby to deposit an impression on the web from the pigmented tape, actuating means normally controlled in synchronism with the intermittent advancement of the web to move said die means to said operative position when the web is at rest and to return said die means to said inoperative position and operate said tape puller means during each advancement of the web, and safety means acting in response to a halt in the operation of said drive motor to condition said actuating means for the return of said die means to said inoperative position thereby to avoid overlong contact of the heated die means with the tape and web if operation of said drive motor is halted while the web is at rest.

10. The combination as in claim 9; wherein said actuating means include motors operated by fluid under pressure for said die means and tape puller means, respectively, and means controlling the supplying of fluid under pressure to said motors including a pilot valve which is open when the web is at rest and closed during each advancement of the web; and wherein said safety means includes a solenoid operated valve electrically connected with said drive motor of the wrapping machine and connected in series with said pilot valve, said solenoid operated valve being open during operation of said drive motor and closed when said drive motor is halted.

11. The combination as in claim 10; wherein said wrapping machine further includes a shaft extending laterally across said in-feed tunnel above said plate and having a clamping member which is moved into and out of gripping engagement with the web on said plate by turning of said shaft when the web is at rest and when the web is advancing, respectively; and wherein said shaft further carries a tripper member extending radially therefrom and engageable with said pilot valve to open the latter when said shaft turns in the direction for moving said clamping member into gripping engagement with the web on said plate.

12. The combination as in claim 10; wherein said wrapping machine further includes a main shaft rotated from said drive motor, and means on said main shaft for operating said pilot valve.

13. The combination of a wrapping machine having an in-feed tunnel through which a continuous web of wrapping material is intermittently advanced toward a cutting station, and marking apparatus comprising a sub-assembly constituting means holding a supply of pigmented tape and mounted at one side of said tunnel, a tape puller sub-assembly mounted at the opposite side of the tunnel and operated pneumatically to intermittently draw the pigmented tape from said holding means across said tunnel, a platen sub-assembly mounted within said tunnel below the web to support the latter at a location traversed by said tape, a die sub-assembly mounted in said tunnel above the web and movable between an inoperative raised position and an operative position where the tape is pressed against the web on said platen to apply an impression to the latter, a pneumatically operated actuating sub-assembly connected to said die sub-assembly for moving the latter between said operative and inoperative positions, control means remote from said actuating sub-assembly and said tape puller sub-assembly and actuated in synchronism with the intermittent advancement of the web of wrapping material, and conduit means for carrying compressed air between said control means, actuating sub-assembly and tape puller sub-assembly to effect the movement of said die sub-assembly to said operative position when the web is at rest and to effect the return of said die sub-assembly to said inoperative position and operation of said tape puller sub-assembly during each advancement of the web.

References Cited in the file of this patent
UNITED STATES PATENTS

| | | |
|---|---|---|
| 677,872 | Locke | July 9, 1901 |
| 2,706,354 | Weber | Apr. 19, 1955 |
| 2,844,094 | Gruver | July 22, 1958 |